United States Patent
Arumugham et al.

(10) Patent No.: US 9,734,017 B2
(45) Date of Patent: Aug. 15, 2017

(54) METHODS FOR DYNAMICALLY DETERMINING AND READJUSTING FAILOVER TARGETS AND DEVICES THEREOF

(71) Applicant: NetApp, Inc., Sunnyvale, CA (US)

(72) Inventors: Kalaivani Arumugham, Sunnyvale, CA (US); Deepa Ramesh, Cupertino, CA (US); Dean Lyle Voiss, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 91 days.

(21) Appl. No.: 14/815,486

(22) Filed: Jul. 31, 2015

(65) Prior Publication Data
US 2017/0031775 A1     Feb. 2, 2017

(51) Int. Cl.
  *G06F 11/00* (2006.01)
  *G06F 11/14* (2006.01)

(52) U.S. Cl.
  CPC ...... *G06F 11/1458* (2013.01); *G06F 2201/84* (2013.01); *G06F 2201/85* (2013.01)

(58) Field of Classification Search
  CPC .......... G06F 11/1458; G06F 2201/84–2201/85
  See application file for complete search history.

(56) References Cited

U.S. PATENT DOCUMENTS

| 2011/0214009 A1* | 9/2011 | Aggarwal | G06Q 10/063 714/4.11 |
| 2012/0089863 A1* | 4/2012 | Goto | G06F 11/2035 714/4.11 |
| 2014/0281257 A1* | 9/2014 | Hochberg | G06F 3/065 711/135 |

* cited by examiner

*Primary Examiner* — Jason Bryan
(74) *Attorney, Agent, or Firm* — LeClairRyan, a Professional Corporation

(57) ABSTRACT

A method, non-transitory computer readable medium, and device that assists with dynamically determining and readjusting failover targets includes identifying an existing failover target from a plurality of failover targets for backing up an updated object. The identified existing failover target is determined for eligibility for backing up the updated object. One or more new failover targets from the plurality of failover targets are dynamically identified based on a plurality of storage parameters when the identified existing failover target is determined not to be eligible for backing up the updated object. The updated object is backed up in one of the dynamically identified one or more new failover targets.

18 Claims, 3 Drawing Sheets

METHODS FOR DYNAMICALLY DETERMINING AND READJUSTING FAILOVER TARGETS AND DEVICES THEREOF

FIELD

This technology generally relates to data storage management and, more particularly, methods for determining and readjusting failover targets and devices thereof.

BACKGROUND

In prior technologies, the failover target of an object is statically predetermined to be a particular storage node and remains to the unchanged. However, prior technologies do not take into account any changes in storage system characteristics on the storage nodes. By way of example, when a failover target does not have the required license to back up an object, prior technologies do not automatically pick a failover target. As a result, there are frequent data outages observed in the prior technologies due to constant change in the characteristics of the storage node or the object.

Additionally, prior technologies do not proactively monitor the ineligibility of the statically determined failover target at frequent intervals to keep up with the ever changing storage system characteristics.

SUMMARY

A method for dynamically determining and readjusting failover targets includes identifying by the storage management computing device an existing failover target from a plurality of failover targets for backing up an updated object. The identified existing failover target is determined for eligibility by the storage management computing device for backing up the updated object. One or more new failover targets from the plurality of failover targets are dynamically identified by the storage management computing device based on a plurality of storage parameters when the identified existing failover target is determined not to be eligible for backing up the updated object. The updated object is backed up in one of the dynamically identified one or more new failover targets by the storage management computing device.

A non-transitory computer readable medium having stored thereon instructions for dynamically determining and readjusting failover targets comprising executable code which when executed by a processor, causes the processor to perform steps includes identifying an existing failover target from a plurality of failover targets for backing up an updated object. The identified existing failover target is determined for eligibility for backing up the updated object. One or more new failover targets from the plurality of failover targets are dynamically identified based on a plurality of storage parameters when the identified existing failover target is determined not to be eligible for backing up the updated object. The updated object is backed up in one of the dynamically identified one or more new failover targets.

A storage management computing device includes a processor and a memory coupled to the processor which is configured to be capable of executing programmed instructions comprising and stored in the memory to identify an existing failover target from a plurality of failover targets for backing up an updated object. The identified existing failover target is determined for eligibility for backing up the updated object. One or more new failover targets from the plurality of failover targets are dynamically identified based on a plurality of storage parameters when the identified existing failover target is determined not to be eligible for backing up the updated object. The updated object is backed up in one of the dynamically identified one or more new failover targets.

This technology provides a number of advantages including providing methods, non-transitory computer readable medium and devices for more effectively and efficiently determining and readjusting failover targets. This technology not only constantly monitors for the eligibly of the failover target, but also identifies more than one failover target for purpose of backing up an object based on storage parameters. By constantly monitoring the failover target's eligibility and identifying more than one failover target, this provides better resiliency over prior technologies by preventing data outage that can happen due to non-availability of failover targets.

DETAILED DESCRIPTION

Figure 1:
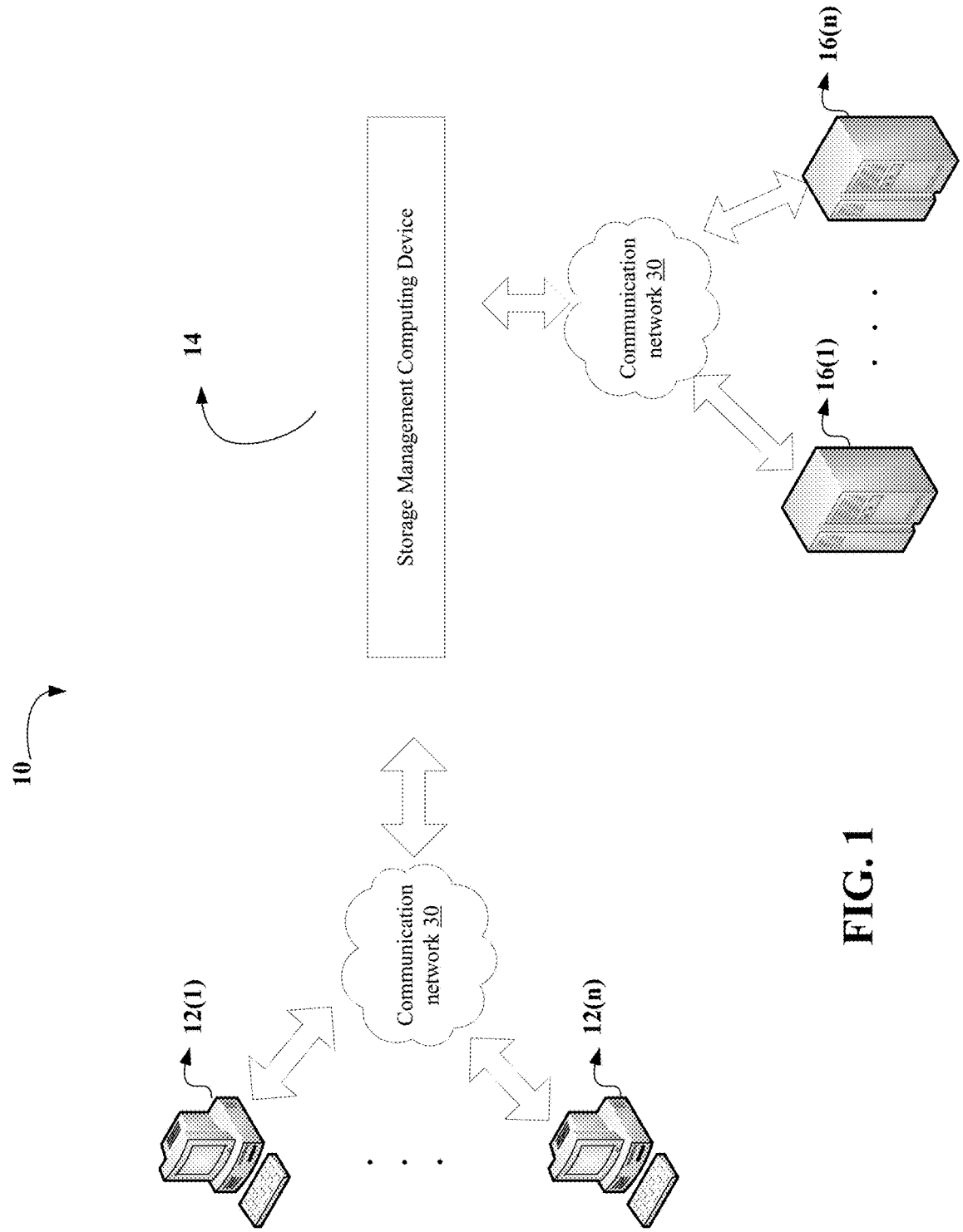
FIG. 1 is a block diagram of an environment with an exemplary storage management computing device.

An environment 10 with a plurality of client computing devices 12(1)-12(n), an exemplary storage management computing device 14, a plurality of storage nodes 16(1)-16(n) is illustrated in FIG. 1. In this particular example, the environment 10 in FIG. 1 includes the plurality of client computing devices 12(1)-12(n), the storage management computing device 14 and a plurality of storage nodes 16(1)-16(n) coupled via one or more communication networks 30, although the environment could include other types and numbers of systems, devices, components, and/or other elements. In this example, the method for dynamically determining and readjusting failover targets is executed by the storage management computing device 14 although the approaches illustrated and described herein could be executed by other systems and devices such as plurality of client computing devices 12(1)-12(n) or plurality of storage nodes 16(1)-16(n). The environment 10 may include other types and numbers of other network elements and devices, as is generally known in the art and will not be illustrated or described herein. This technology provides a number of advantages including providing methods, non-transitory computer readable medium and devices for dynamically determining and readjusting failover targets.

Figure 2:
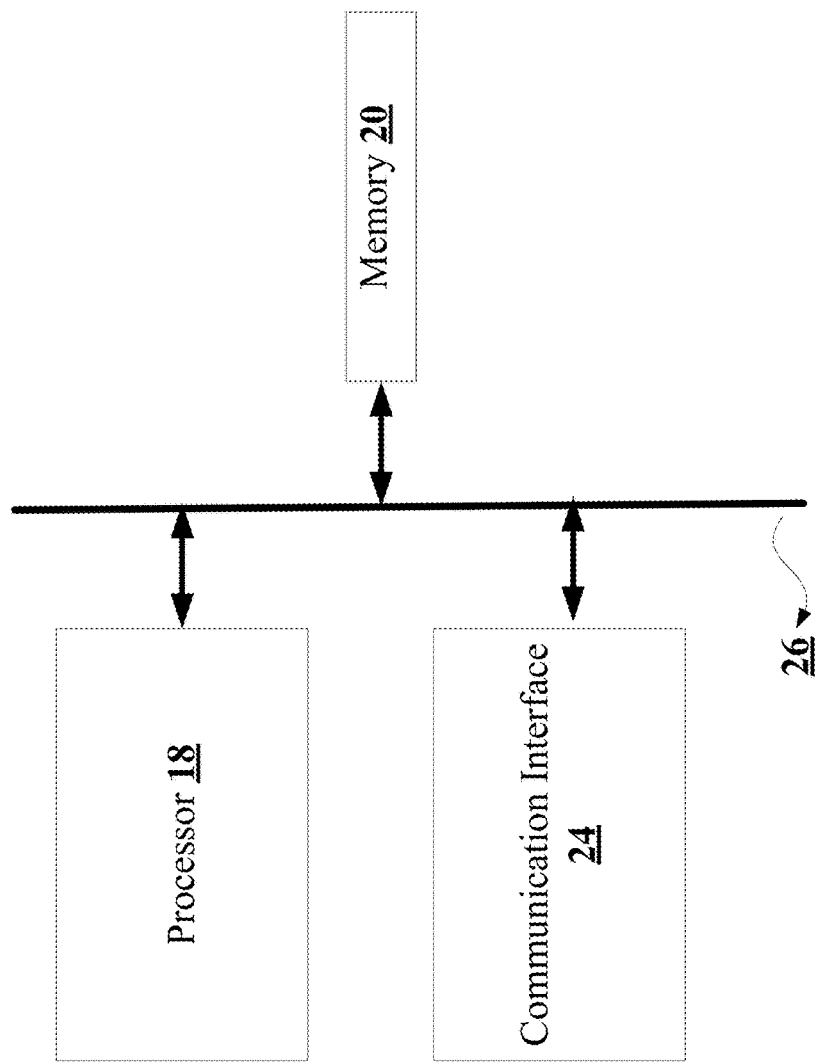
FIG. 2 is a block diagram of the exemplary storage management computing device shown in FIG. 1.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for determining and readjusting failover targets as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage nodes 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hypertransport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 to read or write data into an object stored in the plurality of storage nodes 16(1)-16(n), although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage nodes 16(1)-16(n) via the communication network 30.

Each of the plurality of storage nodes 16(1)-16(n) includes a central processing unit (CPU) or processor, a memory, and an I/O system, which are coupled together by a bus or other link, although other numbers and types of network devices could be used. Each plurality of storage nodes 16(1)-16(n) assists with storing of files or data from the plurality of client computing devices 12(1)-12(n) or the storage management computing device 14 or functioning as a failover target, although the plurality of storage nodes 16(1)-16(n) can assist with other types of operations. In this example, each plurality of storage nodes 16(1)-16(n) can be spread across different geographical locations. In another example, all of the plurality of storage nodes 16(1)-16(n) can be in one geographical location. Various network processing applications, such as CIFS applications, NFS applications, HTTP Web Data storage device applications, and/or FTP applications, may be operating on the plurality of storage nodes 16(1)-16(n) and transmitting data (e.g., files or web pages) in response to requests from the storage management computing device 14 and the plurality of client computing devices 12(1)-12(n). It is to be understood that the plurality of storage nodes 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of storage nodes 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
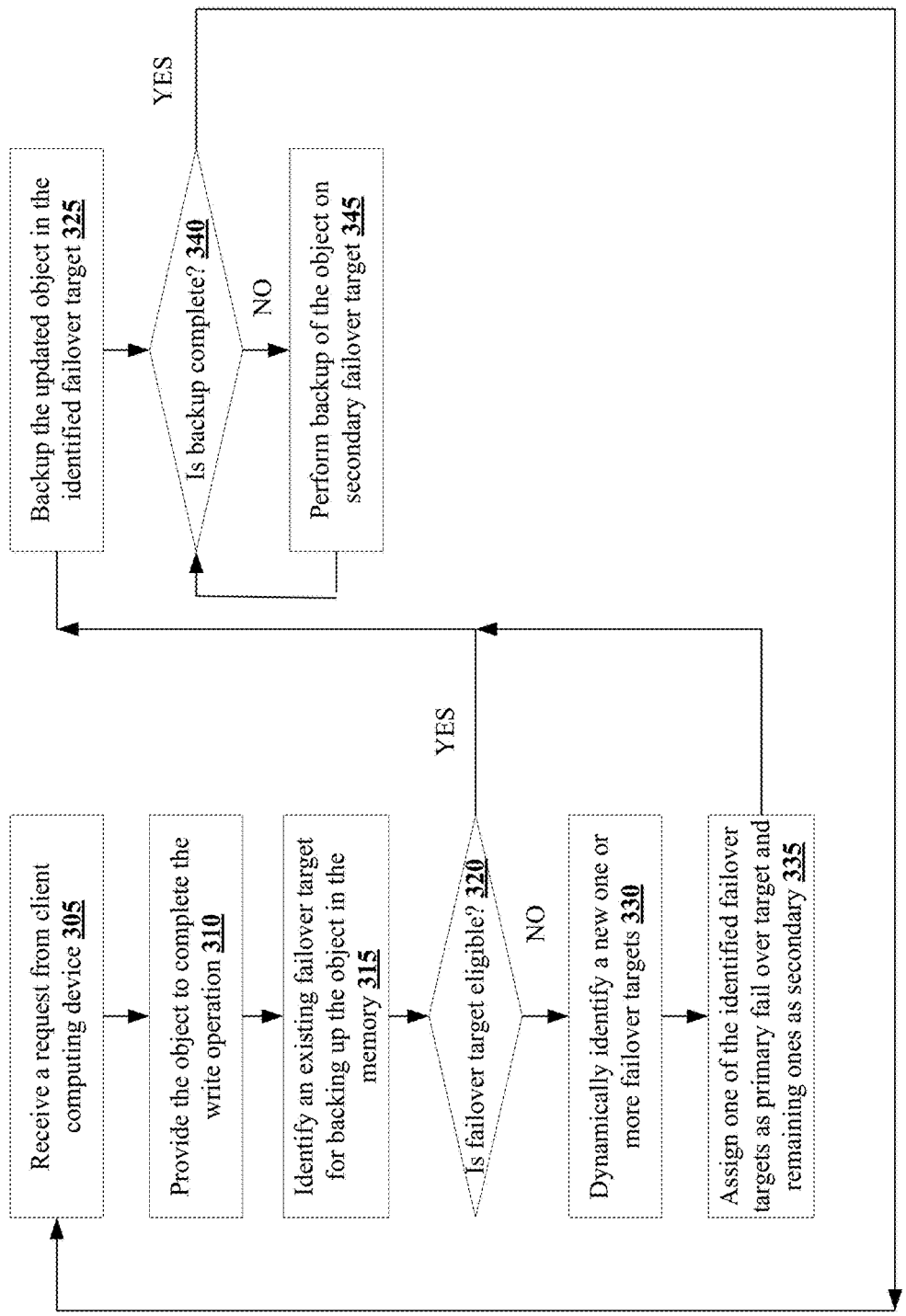
FIG. 3 is a flow chart of an example of a method for dynamically determining and readjusting failover targets.

An example of a method for dynamically determining and readjusting failover targets will now be described herein with reference to FIGS. 1-3. The exemplary method beings at step 305 where the storage management computing device 14 receives a request from one of the plurality of client computing devices 12(1)-12(n) for a write operation on an object stored within memory 20 of the storage management computing device 14, although the storage management computing device can receive other types or amounts of requests.

Next in step 310, the storage management computing device 14 provides the object to the requesting one of the plurality of client computing devices 12(1)-12(n) to complete the write operation, although the storage management computing device 14 can perform other types or amounts of operation to assist the requesting one of the plurality of client computing devices 12(1)-12(n) to complete the write operation.

In step 315, the storage management computing device 14 identifies an existing one of the plurality of storage nodes 16(1)-16(n) as a backup (existing failover target) to store the updated object that was recently written by the requesting one of the plurality of client computing devices 12(1)-12(n). In this example, the storage management computing device 14 identifies existing one of the plurality of storage nodes 16(1)-16(n) as the existing failover target based on the defined instructions from a storage management administrator, although the storage management computing device 14 can use other types or amounts of information while identifying one of the plurality of storage nodes 16(1)-16(n) as a failover target. Additionally in this example, backing up relates to storing an exact same copy of the data and information present in updated object stored in one memory onto one of the failover targets (plurality of storage nodes 16(1)-16(n)).

Next in step 320, the storage management computing device 14 determines when the identified existing failover target which is one of the plurality of storage nodes 16(1)-16(n) is eligible for being the failover target for the updated object that requires backup. By way of example, the storage management computing device 14 determines that the identified existing one of the plurality of storage nodes 16(1)-16(n) is an eligible failover target for the updated object when the identified one of the plurality of storage nodes 16(1)-16(n) has the required license to store the updated object as a backup, although the storage management computing device 14 can consider other types or number of parameters while determining the eligibility of identified one of the plurality of storage nodes 16(1)-16(n) as a failover target. Alternatively, the storage management computing device 14 can check when the identified one of the plurality of storage nodes 16(1)-16(n) is eligible for being the failover target of the updated object when the identified one of the plurality of storage nodes 16(1)-16(n) is functioning without any failure. Accordingly, when the storage management computing device 14 determines that the identified one of the plurality of storage nodes 16(1)-16(n) is an eligible failover target, then the Yes branch is taken to step 325.

In step 325, the storage management computing device 14 stores a copy of the updated object in the identified one of the plurality of storage nodes 16(1)-16(n) that is determined to be an eligible failover target as a backup.

However back in step 320, when the storage management computing device 14 determines that the identified one of the plurality of storage nodes 16(1)-16(n) is not an eligible failover target, then the No branch is taken to step 330.

In step 330, the storage management computing device 14 identifies one or more remaining ones of the plurality of storage nodes 16(1)-16(n) as one or more failover targets to provide a backup for the updated object. In this example, the storage management computing device 14 identified one or more remaining ones of the plurality of storage nodes 16(1)-16(n) as one or more failover targets based on parameters such as: visibility of disk within each of the remaining ones of the plurality of storage nodes 16(1)-16(n); visibility of the updated object; network health of the remaining ones of the plurality of storage nodes 16(1)-16(n); eligibility of the remaining ones of the plurality of storage nodes 16(1)-16(n); software version checks on the remaining ones of the plurality of storage nodes 16(1)-16(n); platform inter portability support of the remaining ones of the plurality of storage nodes 16(1)-16(n); based on hardware configuration of the remaining ones of the plurality of storage nodes 16(1)-16(n) such as the plurality of storage nodes 16(1)-16(n) within the same chassis and the plurality of storage nodes 16(1)-16(n) in different chassis; balanced distribution of the remaining ones of the plurality of storage nodes 16(1)-16(n) across all available resources in a cluster (group of plurality of storage nodes 16(1)-16(n)); based on NVRAM space, type, size in the remaining ones of the plurality of storage nodes 16(1)-16(n); load or head room availability on the remaining ones of the plurality of storage nodes 16(1)-16(n); and/or balanced distribution of objects based on the object priority, although the storage management computing device 14 can consider other types or number of parameters while making the determination.

In next step 335, the storage management computing device 14 assigns one of the one or more dynamically identified plurality of storage nodes 16(1)-16(n) (failover targets) as a primary failover target. In this example, the storage management computing device 14 selects one of the dynamically identified failover targets as a primary failover target when one of the dynamically identified failover target satisfies a threshold number of listed parameters listed above in step 330. By way of example, the threshold number can be dynamically configured by a storage management administrator, although the threshold number can be automatically set based on the type, size and content of the updated object. Additionally, the storage management computing device 14, assigns the remaining ones of the dynamically identified failover targets (other than the primary failover target) as secondary failover targets. In this example, the secondary failover targets can be used as primary failover targets when the dynamically identified primary failover target fails to provide backup to the updated object. Additionally in this example, the storage management computing device 14 periodically checks for the eligibility of the primary and secondary failover targets based on the parameters listed above in step 330 to readjust the primary and secondary failover targets.

In step 340, the storage management computing device 14 determines when the updated object has been successfully backed up in the identified failover target or dynamically identified primary failover target. In this example, the updated object is determined to be successfully backed up in the identified failover target or dynamically identified primary failover target when all the contents of the updated object has been backed up. However, when at least a portion of the contents of the updated object is not backed up, then it is determined that there was a failure in successfully backing up the updated object in this example. By way of example, this failure can happen when the identified failover target or dynamically identified primary failover target fails during the backup operation. Accordingly, when the storage management computing device 14 determines that the backup has failed or not successfully completed, then the No branch is taken to step 345.

In step 345, the storage management computing device 14 performs the backup of the updated object on one of the dynamically identified secondary failover targets. Optionally, the storage management computing device 14 can use the technique illustrated in step 330 to identify a new set of primary and secondary failover targets (plurality of storage nodes 16(1)-16(n)) instead of performing the backup operation on the dynamically identified secondary failover targets. In this example, the flow proceeds back to step 340 to determine when the updated object has been successfully backed up. Alternatively in another example, the storage management computing device 14 can assist with backing up of the updated object in a failover target that is identified by the dynamically identified secondary failover targets. By way of example only, when the storage management computing device 14 tries to back up the updated objected in each of the dynamically identified secondary failover targets individually and fails in each attempt, the storage management computing device 14 can receive information about another or alternative failover target from one of the dynamically identified secondary failover targets. The storage management computing device 14 can use this information received from one of the dynamically identified secondary failover targets to backup the updated object on the another failover target that was identified without having to dynamically identify a new one or more failover targets illustrated in step 330.

Back in step 340, when the storage management computing device 14 determines that the backup has been successfully completed, then the Yes branch is taken back to step 305 where the storage management computing device 14 waits for the next request from the plurality of client computing devices 12(1)-12(n).

Accordingly, as illustrated and described by way of the examples herein, this technology provides methods, non-transitory computer readable medium and devices for more effectively determining and readjusting failover targets. Additionally, this technology provides better resiliency over prior technologies by preventing data outage that can happen due to non-availability of failover targets.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   identifying, by a computing device, an existing failover target from a plurality of failover targets for backing up an updated object;
   determining, by the computing device, when the identified existing failover target is eligible for backing up the updated object;
   dynamically identifying, by the computing device, one or more new failover targets from the plurality of failover targets based on a plurality of storage parameters, a type and size of the updated object, and satisfaction of a threshold number of the plurality of storage parameters which is automatically set based on the type, size and content of the updated object when the identified existing failover target is determined not to be eligible for backing up the updated object; and
   backing up, by the computing device, the updated object in one of the dynamically identified one or more failover targets.

2. he method as set forth in claim 1 wherein the determining further comprises determining the identified existing failover target as being eligible for backing up the updated object when the identified existing failover target has a license to backup the updated object.

3. The method as set forth in claim 1 wherein the plurality of storage parameters comprises one or more of:
   a visibility of a disk within each of the plurality of failover targets;
   an object visibility of the updated object;
   a network health parameter of the plurality of failover targets;
   a software version on the plurality of failover targets;
   a platform inter portability support of the plurality of failover targets;
   a hardware configuration of the plurality of failover targets;
   a load balancing parameter of the plurality of failover targets;
   a NVRAM space, a type, and a size of the plurality of failover targets; or a balanced distribution parameter of a plurality of objects based on a priority of the updated object.

4. The method as set forth in claim 1 wherein the backing up further comprises determining, by the computing device, when the backing up of the updated object is successfully completed in one of the dynamically identified one or more new failover targets.

5. The method as set forth in claim 4 further comprising backing up, by the computing device, the updated object in a remaining one of the dynamically identified one or more new failover targets when the backing up is determined to be a failure.

6. The method as set forth in claim 1 further comprising:
   receiving, by the computing device, information associated with an alternative failover target from one of the dynamically identified one or more new failover targets; and
   backing up, by the computing device, the updated object in the alternative failover target.

7. A non-transitory computer readable medium having stored thereon instructions for dynamically determining and readjusting failover targets comprising executable code which when executed by a processor, causes the processor to perform steps comprising:
   identifying an existing failover target from a plurality of failover targets for backing up an updated object;
   determining when the identified existing failover target is eligible for backing up the updated object;
   dynamically identifying one or more new failover targets from the plurality of failover targets based on a plurality of storage parameters, a type and size of the updated object, and satisfaction of a threshold number of the plurality of storage parameters which is automatically set based on the type, size and content of the updated object when the identified existing failover target is determined not to be eligible for backing up the updated object; and
   backing up the updated object in one of the dynamically identified one or more failover targets.

8. The medium as set forth in claim 7 wherein the determining further comprises determining the identified existing failover target as being eligible for backing up the updated object when the identified existing failover target has a license to backup the updated object.

9. The medium as set forth in claim 7 wherein the plurality of storage parameters comprises one or more of:
   a visibility of a disk within each of the plurality of failover targets;
   an object visibility of the updated object;
   a network health parameter of the plurality of failover targets;
   a software version on the plurality of failover targets;
   a platform inter portability support of the plurality of failover targets;

a hardware configuration of the plurality of failover targets;

a load balancing parameter of the plurality of failover targets;

a NVRAM space, a type, and a size of the plurality of failover targets; or a balanced distribution parameter of a plurality of objects based on a priority of the updated object.

10. The medium as set forth claim 7 wherein the backing up further comprises determining when the backing up of the updated object is successfully completed in one of the dynamically identified one or more new failover targets.

11. The medium as set forth in claim 10 further comprising backing up the updated object in a remaining one of the dynamically identified one or more new failover targets when the backing up is determined to be a failure.

12. The medium as set forth in claim 7 further comprising:
receiving information associated with an alternative failover target from one of the dynamically identified one or more new failover targets; and
backing up the updated object in the alternative failover target.

13. A computing device comprising:
a processor;
a memory coupled to the processor which is configured to be capable of executing programmed instructions comprising and stored in the memory to:
identify an existing failover target from a plurality of failover targets for backing up an updated object;
determine when the identified existing failover target is eligible for backing up the updated object;
dynamically identify one or more new failover targets from the plurality of failover targets based on a plurality of storage parameters, a type and size of the updated object, and satisfaction of a threshold number of the plurality of storage parameters which is automatically set based on the type, size and content of the updated object when the identified existing failover target is determined not to be eligible for backing up the updated object; and
back up the updated object in one of the dynamically identified one or more failover targets.

14. The device as set forth in claim 13 wherein the processor coupled to the memory is further configured to be capable of executing the programmed instructions further comprising and stored in the memory to determine further comprises determining the identified existing failover target as being eligible for backing up the updated object when the identified existing failover target has a license to backup the updated object.

15. The device as set forth in claim 13 wherein the plurality of storage parameters comprises one or more of:
a visibility of a disk within each of the plurality of failover targets;
an object visibility of the updated object;
a network health parameter of the plurality of failover targets;
a software version on the plurality of failover targets;
a platform inter portability support of the plurality of failover targets;
a hardware configuration of the plurality of failover targets;
a load balancing parameter of the plurality of failover targets;
a NVRAM space, a type, and a size of the plurality of failover targets; or
a balanced distribution parameter of a plurality of objects based on a priority of the updated object.

16. The device as set forth in claim 13 wherein the processor coupled to the memory is further configured to be capable of executing the programmed instructions further comprising and stored in the memory to back up further comprises determining when the backing up of the updated object is successfully completed in one of the dynamically identified one or more new failover targets.

17. The device as set forth in claim 16 wherein the processor coupled to the memory is further configured to be capable of executing at least one additional programmed instruction comprising and stored in the memory to back up the updated object in a remaining one of the dynamically identified one or more new failover targets when the backing up is determined to be a failure.

18. The device as set forth in claim 13 wherein the processor coupled to the memory is further configured to be capable of executing at least one additional programmed instruction comprising and stored in the memory to:
receive information associated with an alternative failover target from one of the dynamically identified one or more new failover targets; and
back up the updated object in the alternative failover target.

* * * * *